United States Patent
Deghel et al.

(10) Patent No.: US 12,425,087 B2
(45) Date of Patent: Sep. 23, 2025

(54) ENHANCED CSI CALCULATION CONSIDERING SPATIAL ADAPTATION

(71) Applicant: Nokia Technologies Oy, Espoo (FI)

(72) Inventors: Matha Deghel, Montrouge (FR); Filippo Tosato, Villebon sur Yvette (FR)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 18/928,784

(22) Filed: Oct. 28, 2024

(65) Prior Publication Data

US 2025/0055541 A1 Feb. 13, 2025

Related U.S. Application Data

(63) Continuation of application No. PCT/IB2024/054321, filed on May 3, 2024.

(60) Provisional application No. 63/465,992, filed on May 12, 2023.

(51) Int. Cl.
*H04B 7/06* (2006.01)
*H04W 72/23* (2023.01)

(52) U.S. Cl.
CPC .......... *H04B 7/0626* (2013.01); *H04W 72/23* (2023.01)

(58) Field of Classification Search
CPC ............................. H04B 7/0626; H04W 72/23
See application file for complete search history.

(56) References Cited

U.S. PATENT DOCUMENTS

| | | | | |
|---|---|---|---|---|
| 2021/0143870 A1* | 5/2021 | Faxér | ................ | H04L 5/0057 |
| 2024/0283507 A1* | 8/2024 | Ly | ................ | H04B 7/0482 |
| 2024/0284235 A1* | 8/2024 | Hsieh | ................ | H04W 28/0221 |
| 2024/0340060 A1* | 10/2024 | Tseng | ................ | H04B 7/0626 |
| 2024/0340146 A1* | 10/2024 | Chen | ................ | H04L 5/0053 |

(Continued)

FOREIGN PATENT DOCUMENTS

WO WO 2023/050312 A1 4/2023

OTHER PUBLICATIONS

QUALCOMM Incorporated, "Techniques in spatial and power domains," 3GPP TSG RAN WG1 #112bis-e, R1-2303603, Apr. 17-26, 2023.

(Continued)

*Primary Examiner* — John D Blanton
(74) *Attorney, Agent, or Firm* — McCarter & English, LLP; Joseph C. Drish

(57) ABSTRACT

A method includes: receiving, from a network, a channel state information report configuration including one or more sub-configurations, wherein a sub-configuration of the one or more sub-configurations is associated with at least one channel state information reference signal antenna port subset; determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculating the one or more channel state information quantities for the sub-configuration, based on the formed hypothetical physical downlink shared channel.

14 Claims, 6 Drawing Sheets

(56) References Cited

U.S. PATENT DOCUMENTS

2024/0340786 A1* 10/2024 Wu .................. H04W 52/0203
2024/0357393 A1* 10/2024 Ly ........................ H04L 5/0053

OTHER PUBLICATIONS

Ericsson, "Network energy saving techniques," 3GPP TSG RAN WG1 #110bis-e, R1-2209859, Oct. 10-19, 2022.
Samsung, "Network energy saving techniques," 3GPP TSG RAN WG1 #111, R1-2212057, Toulouse, France, Nov. 14-18, 2022.
Panasonic, "Spatial and power domain adaptation for network energy saving," 3GPP TSG RAN WG1 #112bis-e, R1-2302389, Apr. 17-26, 2023.

* cited by examiner

ENHANCED CSI CALCULATION CONSIDERING SPATIAL ADAPTATION

CROSS REFERENCE TO RELATED APPLICATION

This Application is a Continuation-in-part of Application PCT/IB2024/054321 filed on May 3, 2024. Application PCT/IB2024/054321 claims the benefit of U.S. Provisional Application 63/465,992 filed on May 12, 2023. The entire contents of these applications are incorporated herein by reference in their entirety.

TECHNICAL FIELD

The examples and non-limiting example embodiments relate generally to communications and, more particularly, to enhanced CSI calculation considering spatial adaptation.

BACKGROUND

It is known for a user equipment to communicate using resources in a communication network.

BRIEF SUMMARY

This section is intended to include examples and is not intended to be limiting.

In an exemplary embodiment, a method is disclosed that includes receiving, from a network, a channel state information report configuration comprising one or more sub-configurations, wherein a sub-configuration of the one or more sub-configurations is associated with at least one channel state information reference signal antenna port subset; determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculating the one or more channel state information quantities for the sub-configuration, based on the formed hypothetical physical downlink shared channel.

In an exemplary embodiment, an apparatus comprises at least one processor, and at least one memory storing instructions that, when executed by the at least one processor, cause the apparatus at least to: receive, from a network, a channel state information report configuration comprising one or more sub-configurations, wherein a sub-configuration of the one or more sub-configurations is associated with at least one channel state information reference signal antenna port subset; determine, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculate the one or more channel state information quantities for the sub-configuration, based on the formed hypothetical physical downlink shared channel.

In an exemplary embodiment, an apparatus comprises means for receiving, from a network, a channel state information report configuration comprising one or more sub-configurations, wherein a sub-configuration of the one or more sub-configurations is associated with at least one channel state information reference signal antenna port subset; means for determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and means for calculating the one or more channel state information quantities for the sub-configuration, based on the formed hypothetical physical downlink shared channel.

In an exemplary embodiment, a computer readable medium stores program instructions executable by at least one processor for performing operations. The operations comprise: receiving, from a network, a channel state information report configuration comprising one or more sub-configurations, wherein a sub-configuration of the one or more sub-configurations is associated with at least one channel state information reference signal antenna port subset; determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculating the one or more channel state information quantities for the sub-configuration, based on the formed hypothetical physical downlink shared channel.

In an exemplary embodiment, a method is disclosed that includes determining a channel state information report configuration comprising one or more sub-configurations, wherein a sub-configuration of the one or more sub-configurations is associated with at least one channel state information reference signal antenna port subset; transmitting, to a user equipment, a channel state information report configuration comprising the one or more sub-configurations; receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determining spatial adaptation for a set of at least one spatial element, based on the channel state information report.

In an exemplary embodiment, an apparatus comprises at least one processor, and at least one memory storing instructions that, when executed by the at least one processor, cause the apparatus at least to: determine a channel state information report configuration comprising one or more sub-configurations, wherein a sub-configuration of the one or more sub-configurations is associated with at least one channel state information reference signal antenna port subset; transmit, to a user equipment, a channel state information report configuration comprising the one or more sub-configurations; receive, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determine spatial adaptation for a set of at least one spatial element, based on the channel state information report.

In an exemplary embodiment, an apparatus comprises means for determining a channel state information report configuration comprising one or more sub-configurations, wherein a sub-configuration of the one or more sub-configurations is associated with at least one channel state information reference signal antenna port subset; means for transmitting, to a user equipment, a channel state information report configuration comprising the one or more sub-configurations; means for receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and means for determining spatial adaptation for a set of at least one spatial element, based on the channel state information report.

In an exemplary embodiment, a computer readable medium stores program instructions executable by at least one processor for performing operations. The operations comprise: determining a channel state information report configuration comprising one or more sub-configurations, wherein a sub-configuration of the one or more sub-configurations is associated with at least one channel state information reference signal antenna port subset; transmitting, to a user equipment, a channel state information report configuration comprising the one or more sub-configurations; receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determining spatial adaptation for a set of at least one spatial element, based on the channel state information report.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
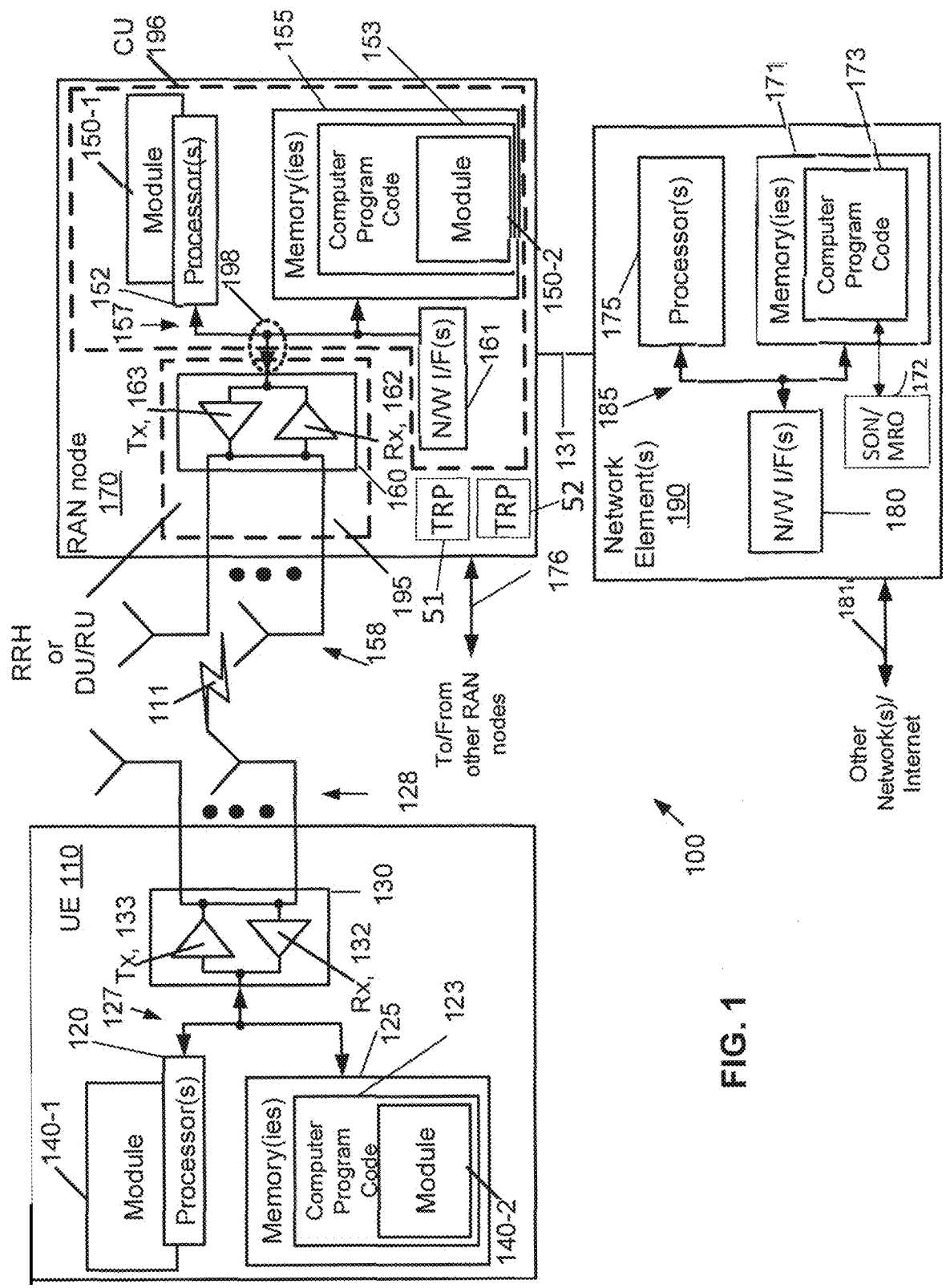
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including enhanced CSI calculation considering spatial adaptation. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

Spatial adaptation at the gNB is under discussion within the item of network energy saving in RAN1.

Network energy saving is of great importance for environmental sustainability, to reduce environmental impact (greenhouse gas emissions), and for operational cost savings. As 5G is becoming pervasive across industries and geographical areas, handling more advanced services and applications requiring very high data rates (e.g. XR), networks are being denser, and using more antennas, larger bandwidths and more frequency bands. The environmental impact of 5G needs to stay under control, and novel solutions to improve network energy savings need to be developed.

Energy consumption has become a key part of the operators' OPEX. According to GSMA, the energy cost on mobile networks accounts for approximately 23% of the total operator cost. Most of the energy consumption comes from the radio access network and in particular from the active antenna unit (AAU), with data centers and fiber transport accounting for a smaller share. The power consumption of a radio access can be split into two parts: the dynamic part which is only consumed when data transmission or reception is ongoing, and the static part which is consumed all the time to maintain the necessary operation of the radio access devices, even when the data transmission/reception is not on-going.

CSI-RS reference signals are UE-specifically configured in RRC. However, CSI-RS reference signals can be shared among many UEs, i.e., more than one UE is configured to receive the same resource elements (REs).

In general, in order to save on DL resources, the gNB tries to use cell-specific or group-specific CSI-RS resources. The worst case of DL overhead is with UE specific CSI-RS where the DL overhead increases linearly with the number of UEs in the cell.

CSI-RS has many functions in NR, e.g.: CSI-RS for DL CSI acquisition, CSI-RS for beam management (BM) (based on L1-RSRP), CSI-RS for tracking (TRS), UL CSI acquisition in reciprocity-based UL precoding.

In some applications (e.g., CSI-RS for BM) CSI-RS are spatially beamformed into different directions. In general, a UE can be configured with up to 48 report configurations per component carrier (CC) divided by 4 per bandwidth part (BWP). One CSI resource configuration within 1 report configuration can be configured with up to 16 resource sets (aperiodic CSI) and 1 resource set (otherwise). In each CSI resource set there are up to 64 NZP CSI-RS resources and 1 NZP-CSI-RS resource up to 32 antenna ports.

For CSI acquisition, the UE is configured also with a codebook type. Given the measured channel across a CSI-RS resource, the UE can choose a favorite codeword from the specified codebook, i.e., precoding matrix indicator (PMI), along with channel quality indicator (CQI) and rank indicator (RI). The UE can also be configured to measure several CSI-RS resources (up to 8) within a resource set and report the favorite resource, CSI-RS resource indicator (CRI), along with PMI, CQI and RI which corresponds to that selected resource.

In the time domain, a CSI-RS resource may start at any OFDM symbol of a slot and it spans 1, 2, or 4 OFDM symbols depending on the number of ports configured.

Likewise, the UE measurement reporting of CSI can be also operated in a periodic, semi-persistent, or aperiodic manner, which are referred to as report types in the NR report configuration. However, there are certain limitations, based on which the UE periodic report can operate only based on the configured periodic CSI-RS resource-set, the UE semi-persistent report can operate based on both configured periodic and semi-persistent CSI-RS resource-set, and finally the UE aperiodic report can operate based on all of the periodic, semi-persistent, and aperiodic CSI-RS resource-set.

In summary, the periodic CSI-RS resources can be used to generate any report type, the semi-persistent and periodic CSI-RS resources can be used to generate semi-persistent CSI reports, and the aperiodic CSI-RS can only be utilized only to generate the aperiodic report.

All CSI-RS resources within one set are configured with the same density and the same number of ports (nrofPorts), except for the NZP CSI-RS resources used for interference measurement.

For semi-persistent and aperiodic CSI-RS, the actual triggering of CSI-RS transmission is per the CSI-RS resource-set via either the MAC CE or DCI. And a resource set can be used as part of UE report configurations describing what is to be measured and, correspondingly, which measurement reporting is to be done by the UE. Specifically, if a CSI-RS resource-set is configured as 'aperiodic' by RRC, the CSI-RS resource set configuration includes a slot offset, and an aperiodicTriggeringOffset which defines the time interval between the triggering DCI and the CSI-RS transmission.

For A-CSI reporting up to 16 different reporting settings can be triggered with a single DCI (e.g. for multiple component carriers) while SP-CSI reporting can trigger only one report setting with a single DCI. In order to trigger several SP-CSI reports (each in different slots), multiple DCIs are needed.

Figure 2:
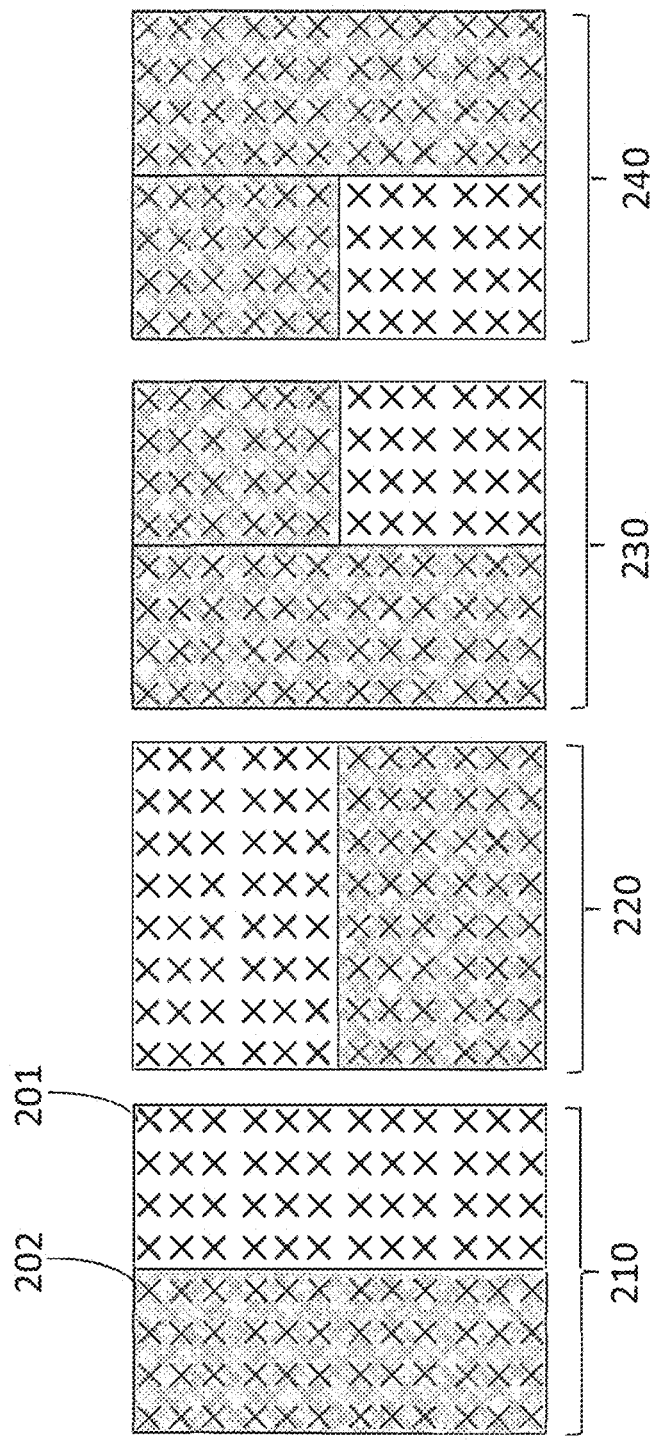
FIG. 2 shows example spatial adaptation patterns.

FIG. 2 is an example illustrating spatial (adaptation) patterns of spatial elements. The dotted/grey boxes correspond to muted spatial elements. Each spatial element is represented with an 'X', such as element 201 which is not muted and element 202 which is muted.

Spatial patterns 210, 220, 230, and 240 are shown for a set of spatial elements. In spatial pattern 210, the spatial elements on the left hand side of the set of spatial elements are muted and the spatial elements on the right hand side of the set of spatial elements are not muted. In spatial pattern 220, the spatial elements in the top half of the set of spatial elements are not muted and the spatial elements in the bottom half of the set of spatial elements are muted. In spatial pattern 230, the spatial elements on the left hand side of the set of spatial elements are muted, the spatial elements in the top half of the right hand side of the set of spatial elements are muted, and the spatial elements in the bottom half of the right hand side of the set of spatial elements are not muted. In spatial pattern 240, the spatial elements in the top half of the left hand side of the set of spatial elements are muted, the spatial elements in the bottom half of the left hand side of the set of spatial elements are not muted, and the spatial elements on the right hand side of the set of spatial elements are muted.

Spatial (dynamic) adaptation will be specified in Rel-18 NR. CSI enhancements will be specified wherein a UE may calculate and report multiple CSIs corresponding to different spatial (adaptation) patterns. This is to enable the gNB to make appropriate decision regarding spatial adaptation.

The examples described herein relate to the aspect of CSI calculation and/or derivation in order to enable an efficient spatial adaptation procedure. Specifically, the focus is mainly on enhancing and/or adapting the CQI calculation operation considering different spatial adaptation patterns (e.g., corresponding to different port subsets).

For a CSI report configuration containing multiple sub-configurations corresponding to different spatial adaptation patterns, multiple CSIs associated with the multiple sub-configurations are reported in a CSI reporting instance. However how CSI is calculated and/or derived for a sub-configuration is unclear and needs to be specified in the standards.

The solution described herein is that, for CQI calculation for a sub-configuration corresponding to or indicating at least one CSI-RS antenna port subset or set, a UE (e.g. UE 110) forms a hypothetical PDSCH by assuming an antenna port restriction based on the at least one antenna port subset or set.

Accordingly, the examples described herein relate to extension to multiple sub-configurations. For each sub-configuration of the multiple sub-configurations, the hypothetical PDSCH is based on CSI-RS antenna ports corresponding to each sub-configuration.

In particular, described herein is a UE 110 that receives, from a network, a CSI report configuration comprising one or more sub-configurations, wherein a sub-configuration of the one or more sub-configurations is associated with at least one CSI-RS antenna port subset or set, and determines that calculation of one or more CSI quantities for the sub-configuration is based on the at least one CSI-RS antenna port subset or set. The UE determines that, for calculation of the one or more CSI quantities for the sub-configuration, PDSCH signals on PDSCH antenna ports for a number of layers result in signals equivalent to corresponding symbols transmitted on the at least one CSI-RS antenna port subset or set. The one or more CSI quantities comprise at least one of CQI, layer indication, PMI, RSRP, L1-SINR. Each of the one or more sub-configuration is associated with at least one of: a spatial pattern at the network, a power level, an energy level, a CSI-RS resource, a CSI-RS resource set or group, a resource setting, a CSI report configuration, a codebook configuration, or a CSI triggering state.

In the herein described solution, if a UE is configured with a CSI report configuration that includes or is associated with multiple sub-configurations, each of the multiple sub-configurations corresponds to or indicates at least one CSI-RS antenna port subset or set (or number).

For CQI calculation for a sub-configuration corresponding to or indicating at least one CSI-RS antenna port subset or set, the UE forms a hypothetical PDSCH by assuming or considering an antenna port restriction based on the at least one antenna port subset or set the sub-configuration corresponds to or indicates.

Specifically, considering a computed or derived rank for a sub-configuration, for CQI calculation for the sub-configuration the UE assumes that: PDSCH signals on PDSCH antenna ports corresponding to the number of layers (i.e., rank) of the sub-configuration would result in signals equivalent to corresponding symbols transmitted on an CSI-RS antenna port subset or set the sub-configuration indicates or corresponds to. The UE 110 derives the rank (i.e. the number of layers) for the sub-configuration and may provide the rank to the gNB 170 in the CSI report.

The CSI-RS antenna port subsets corresponding respectively to multiple sub-configurations may be associated with a same CSI-RS resource (or even resource set).

Additionally, or alternatively, the CSI-RS antenna ports of a sub-configuration may be a set or subset of a set (or number) of CSI-RS antenna ports indicated through the CSI report configuration that includes the sub-configuration. Alternatively, the CSI-RS antenna ports of one sub-configuration may be a subset of a set of CSI-RS antenna ports of another or reference CSI report sub-configuration, where the two sub-configurations are included or correspond to a same CSI-RS report configuration (or common CSI-RS report configuration).

Each of the multiple sub-configurations in the CSI report configuration may correspond to or be associated to at least one of the following: spatial (adaptation) pattern—different patterns have different subset or set (or number) of active or muted spatial elements, (such as antenna ports, antenna elements, etc.), power level, energy level, CSI-RS resource, CSI-RS resource set or group, resource setting, CSI report configuration, codebook configuration, or CSI triggering state.

The UE 110 may be triggered or activated or indicated via MAC CE or DCI to compute CSI such as CQI for one or more sub-configurations of a CSI report configuration.

Figure 3:
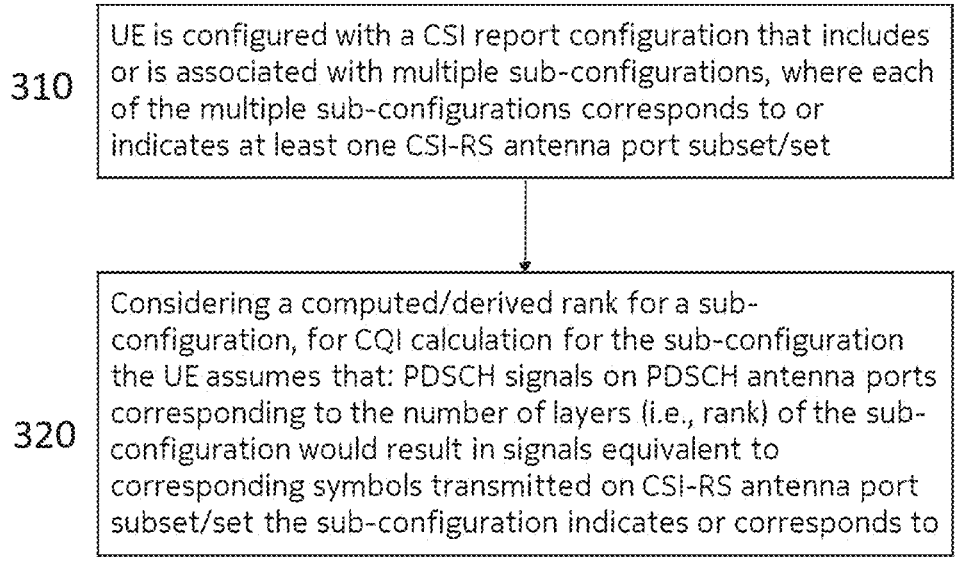
FIG. 3 is a high-level illustration of the herein described UE operation for CQI calculation for a sub-configuration representing a spatial adaptation pattern.

FIG. 3 is a high-level illustration of the proposed UE operation for CQI calculation for a sub-configuration representing a spatial adaptation pattern. At 310, the UE is configured with a CSI report configuration that includes or is associated with multiple sub-configurations, where each of the multiple sub-configurations corresponds to or indicates at least one CSI-RS antenna port subset or set. At 320, considering a computed or derived rank for a sub-configuration, for CQI calculation for the sub-configuration the UE assumes that: PDSCH signals on PDSCH antenna ports corresponding to the number of layers (i.e., rank) of the sub-configuration would result in signals equivalent to corresponding symbols transmitted on the CSI-RS antenna port subset or set the sub-configuration indicates or corresponds to.

Accordingly, based on the examples described herein, if a UE is configured with a CSI report configuration that includes or is associated with multiple sub-configurations, where each of the multiple sub-configurations corresponds to or indicates at least one CSI-RS antenna port subset, for CQI calculation for a sub-configuration indicating or associated to an antenna port subset $[p^{(0)}, \ldots, p^{(P-1)}]$ of size P: The UE should assume that PDSCH signals on antenna ports in the set $[1000, \ldots, 1000+v-1]$ for v layers would result in signals equivalent to corresponding symbols transmitted on antenna ports $[3000+p^{(0)}-1, \ldots, 3000+p^{(P-1)}-1]$, as given by $$\begin{bmatrix} y^{(3000+p^{(0)}-1)}(i) \\ \ldots \\ y^{(3000+p^{(P-1)}-1)}(i) \end{bmatrix} = W(i) \begin{bmatrix} x^{(0)}(i) \\ \ldots \\ x^{(v-1)}(i) \end{bmatrix}$$

Where $p^{(j)} \in [1, \ldots, 32]$, $j = 0, \ldots, P-1$.

It is worth noting that, although the focus herein has been on CQI, other CSI parameters might also be considered such as LI (layer indication), RSRP, L1-SINR, etc. This could be done by essentially replacing CQI by any of these CSI parameters.

Advantages and technical effects of the herein described solution include enablement of correct CSI and/or CQI calculation for a sub-configuration or spatial adaptation pattern corresponding to an antenna port subset or set, and adapting the CSI and/or CQI calculation considering multiple sub-configurations and/or spatial adaptation patterns.

The examples described herein may be related to and adopted for Rel-18 energy efficiency enhancements, CSI enhancements for MIMO, and the 3GPP specifications.

Figure 4:
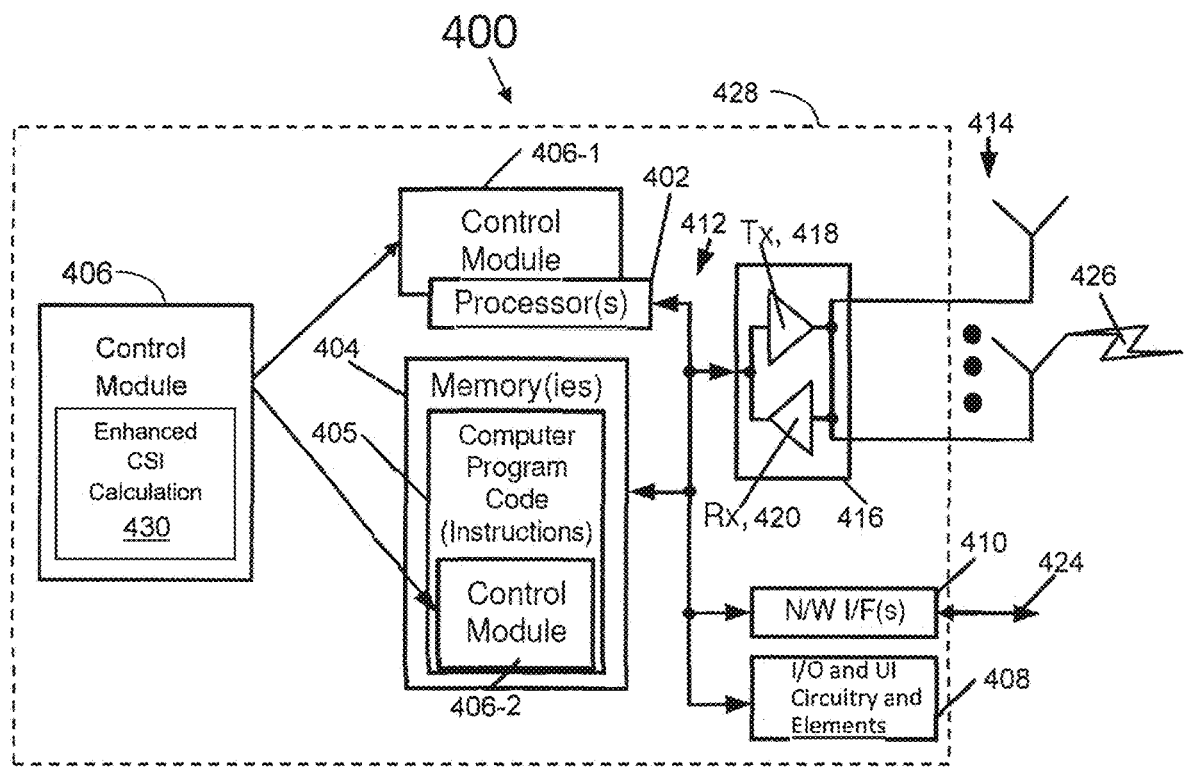
FIG. 4 is an example apparatus configured to implement the examples described herein.

FIG. 4 is an example apparatus 400, which may be implemented in hardware, configured to implement the examples described herein. The apparatus 400 comprises at least one processor 402 (e.g. an FPGA and/or CPU), one or more memories 404 including computer program code 405, the computer program code 405 having instructions to carry out the methods described herein, wherein the at least one memory 404 and the computer program code 405 are configured to, with the at least one processor 402, cause the apparatus 400 to implement circuitry, a process, component, module, or function (implemented with control module 406) to implement the examples described herein, including enhanced CSI calculation considering spatial adaptation. The memory 404 may be a non-transitory memory, a transitory memory, a volatile memory (e.g. RAM), or a non-volatile memory (e.g. ROM). Enhanced CSI calculation 430 of the control module implements the herein described aspects related to enhanced CSI calculation considering spatial adaptation.

The apparatus 400 includes a display and/or I/O interface 408, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 400 includes one or more communication e.g. network (N/W) interfaces (I/F(s)) 410. The communication I/F(s) 410 may be wired and/or wireless and communicate over the Internet/other network(s) via any communication technique including via one or more links 424. The link(s) 424 may be the link(s) 131 and/or 176 from FIG. 1. The link(s) 131 and/or 176 from FIG. 1 may also be implemented using transceiver(s) 416 and corresponding wireless link(s) 426. The communication I/F(s) 410 may comprise one or more transmitters or one or more receivers.

The transceiver 416 comprises one or more transmitters 418 and one or more receivers 420. The transceiver 416 and/or communication I/F(s) 410 may comprise standard well-known components such as an amplifier, filter, frequency-converter, (de)modulator, and encoder/decoder circuitries and one or more antennas, such as antennas 414 used for communication over wireless link 426.

The control module 406 of the apparatus 400 comprises one of or both parts 406-1 and/or 406-2, which may be implemented in a number of ways. The control module 406 may be implemented in hardware as control module 406-1, such as being implemented as part of the one or more processors 402. The control module 406-1 may be implemented also as an integrated circuit or through other hardware such as a programmable gate array. In another example, the control module 406 may be implemented as control module 406-2, which is implemented as computer program code (having corresponding instructions) 405 and is executed by the one or more processors 402. For instance, the one or more memories 404 store instructions that, when executed by the one or more processors 402, cause the apparatus 400 to perform one or more of the operations as described herein. Furthermore, the one or more processors 402, the one or more memories 404, and example algorithms (e.g., as flowcharts and/or signaling diagrams), encoded as instructions, programs, or code, are means for causing performance of the operations described herein.

The apparatus 400 to implement the functionality of control 406 may be UE 110, RAN node 170 (e.g. gNB), or network element(s) 190. Thus, processor 402 may correspond to processor(s) 120, processor(s) 152 and/or processor(s) 175, memory 404 may correspond to one or more memories 125, one or more memories 155 and/or one or more memories 171, computer program code 405 may correspond to computer program code 123, computer program code 153, and/or computer program code 173, control module 406 may correspond to module 140-1, module 140-2, module 150-1, and/or module 150-2, and communication I/F(s) 410 and/or transceiver 416 may correspond to transceiver 130, antenna(s) 128, transceiver 160, antenna(s) 158, N/W I/F(s) 161, and/or N/W I/F(s) 180. Alternatively, apparatus 400 and its elements may not correspond to either of UE 110, RAN node 170, or network element(s) 190 and their respective elements, as apparatus 400 may be part of a self-organizing/optimizing network (SON) node or other node, such as a node in a cloud.

The apparatus 400 may also be distributed throughout the network (e.g. 100) including within and between apparatus 400 and any network element (such as a network control element (NCE) 190 and/or the RAN node 170 and/or the UE 110).

Interface 412 enables data communication and signaling between the various items of apparatus 400, as shown in FIG. 4. For example, the interface 412 may be one or more buses such as address, data, or control buses, and may include any interconnection mechanism, such as a series of lines on a motherboard or integrated circuit, fiber optics or other optical communication equipment, and the like. Computer program code (e.g. instructions) 405, including control 406 may comprise object-oriented software configured to pass data or messages between objects within computer program code 405. The apparatus 400 need not comprise each of the features mentioned, or may comprise other features as well. The various components of apparatus 400 may at least partially reside in a common housing 428, or a subset of the various components of apparatus 400 may at least partially be located in different housings, which different housings may include housing 428.

Figure 5:
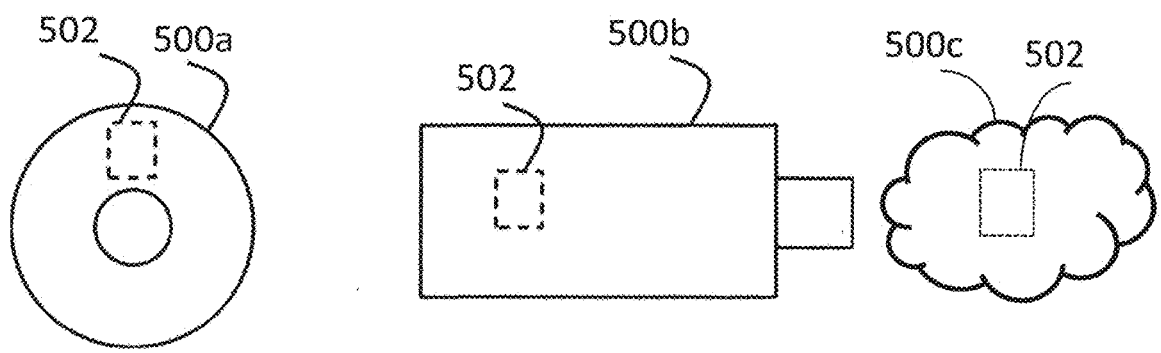
FIG. 5 shows a representation of an example of non-volatile memory media used to store instructions that implement the examples described herein.

FIG. 5 shows a schematic representation of non-volatile memory media 500a (e.g. computer/compact disc (CD) or digital versatile disc (DVD)) and 500b (e.g. universal serial bus (USB) memory stick) and 500c (e.g. cloud storage for downloading instructions and/or parameters 502) storing instructions and/or parameters 502 which when executed by a processor allows the processor to perform one or more of the steps of the methods described herein.

Figure 6:
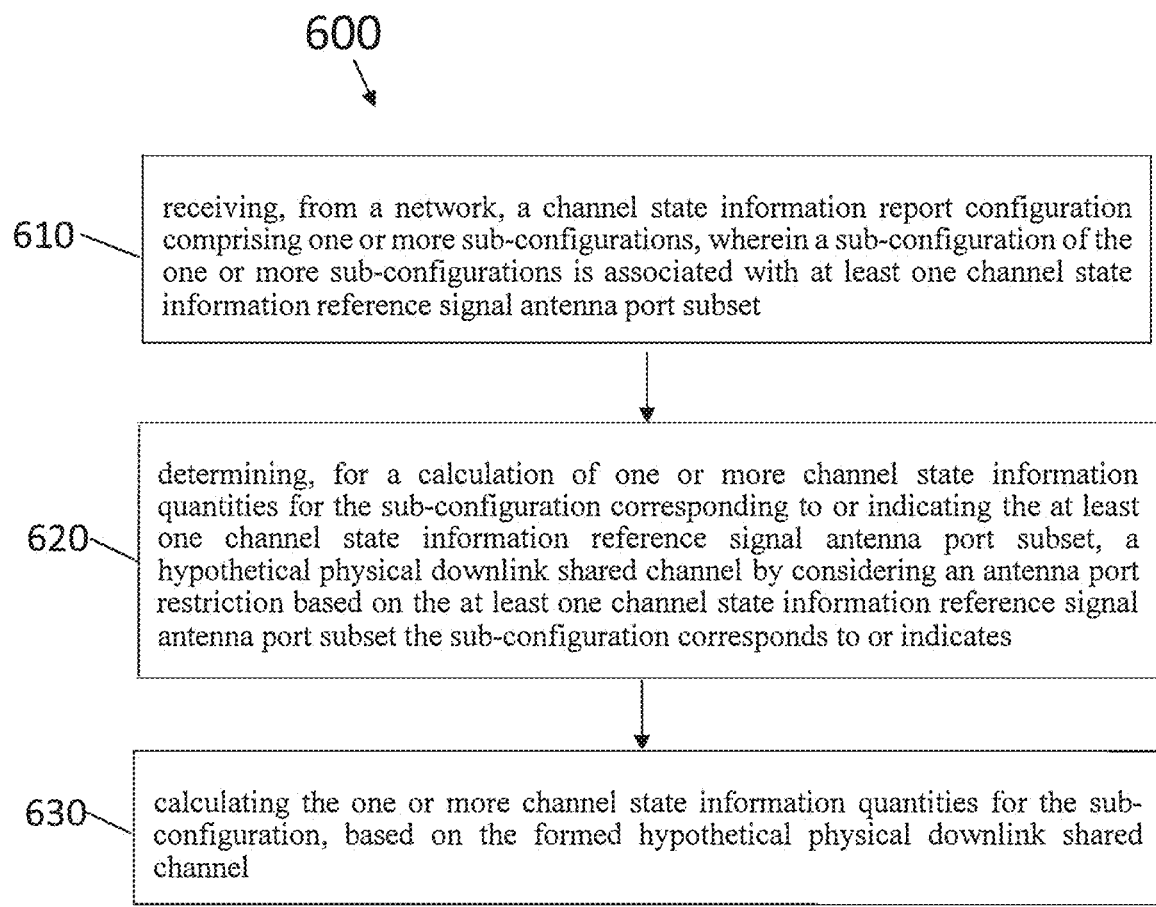
FIG. 6 is an example method, based on the examples described herein.

FIG. 6 is an example method 600, based on the example embodiments described herein. At 610, the method includes receiving, from a network, a channel state information report configuration comprising one or more sub-configurations, wherein a sub-configuration of the one or more sub-configurations is associated with at least one channel state information reference signal antenna port subset. At 620, the method includes determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates. At 630, the method includes calculating the one or more channel state information quantities for the sub-configuration, based on the formed hypothetical physical downlink shared channel. Method 600 may be performed with UE 110 or apparatus 400.

Figure 7:
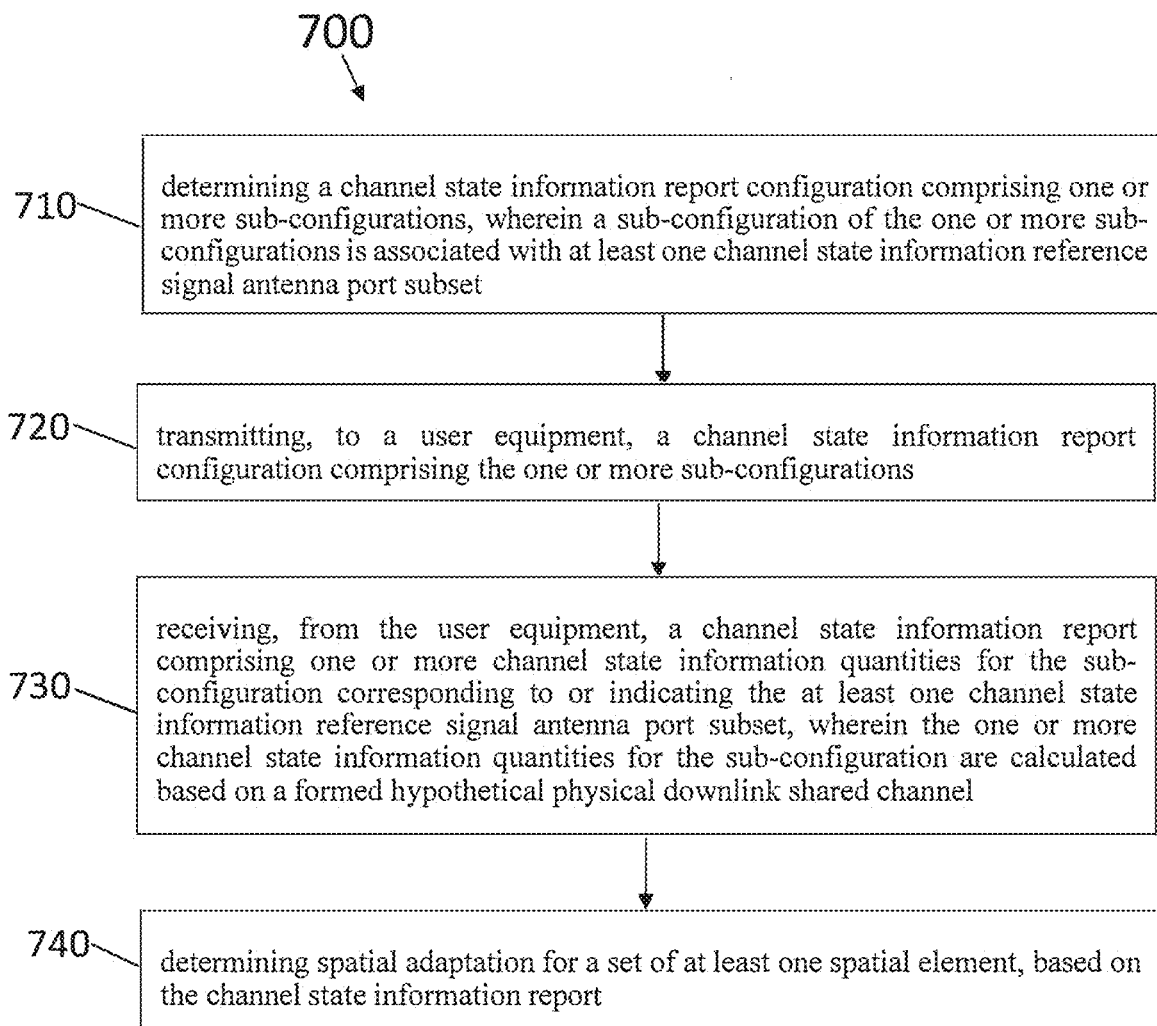
FIG. 7 is an example method, based on the examples described herein.

FIG. 7 is an example method 700, based on the example embodiments described herein. At 710, the method includes determining a channel state information report configuration comprising one or more sub-configurations, wherein a sub-configuration of the one or more sub-configurations is associated with at least one channel state information reference signal antenna port subset. At 720, the method includes transmitting, to a user equipment, a channel state information report configuration comprising the one or more sub-configurations. At 730, the method includes receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel. At 740, the method includes determining spatial adaptation for a set of at least one spatial element, based on the channel state information report. Method 700 may be performed with RAN node 170 or apparatus 400.

The following examples are provided and described herein.

Example 1. An apparatus including: at least one processor; and at least one memory storing instructions that, when executed by the at least one processor, cause the apparatus at least to: receive, from a network, a channel state information report configuration comprising one or more sub-configurations, wherein a sub-configuration of the one or more sub-configurations is associated with at least one channel state information reference signal antenna port subset; determine, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculate the one or more channel state information quantities for the sub-configuration, based on the formed hypothetical physical downlink shared channel.

Example 2. The apparatus of example 1, wherein the determining of the hypothetical physical downlink shared channel comprises determining that physical downlink shared channel signals on physical downlink shared channel antenna ports for a number of layers result in signals equivalent to corresponding symbols transmitted on the at least one channel state information reference signal antenna port subset.

Example 3. The apparatus of any of example 1 or 2, wherein the instructions, when executed by the at least one processor, cause the apparatus at least to: calculate the number of layers for the sub-configuration; wherein the calculation of the one or more channel state information quantities for the sub-configuration is based on the calculated number of layers for the sub-configuration.

Example 4. The apparatus of example 3, wherein the number of layers corresponds to a rank of the sub-configuration for which the one or more channel state information quantities are calculated.

Example 5. The apparatus of example 4, wherein the instructions, when executed by the at least one processor, cause the apparatus at least to: transmit, to a network node, the one or more channel state information quantities of the rank within a channel state information report determined based on the channel state information report configuration.

Example 6. The apparatus of any of examples 1 to 5, wherein the one or more channel state information quantities comprise at least one of: a channel quality indicator, a layer indication, a precoding matrix indicator, reference signal received power, a rank indicator, or a layer 1 signal to interference plus noise ratio.

Example 7. The apparatus of any of examples 1 to 6, wherein one or more channel state information reference signal antenna port subsets corresponding to the one or more sub-configurations are associated with a same channel state information reference signal resource or resource set.

Example 8. The apparatus of any of examples 1 to 7, wherein a sub-configuration of the one or more sub-configurations is associated with at least one of: a spatial pattern, a power level, an energy level, a channel state information reference signal resource, a channel state information reference signal resource set or group, a resource setting, a channel state information report configuration, a codebook configuration, or a channel state information triggering state.

Example 9. An apparatus including: at least one processor; and at least one memory storing instructions that, when executed by the at least one processor, cause the apparatus at least to: determine a channel state information report configuration comprising one or more sub-configurations, wherein a sub-configuration of the one or more sub-configurations is associated with at least one channel state information reference signal antenna port subset; transmit, to a user equipment, a channel state information report configuration comprising the one or more sub-configurations; receive, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determine spatial adaptation for a set of at least one spatial element, based on the channel state information report.

Example 10. The apparatus of example 9, wherein the one or more channel state information quantities comprise a channel state information quantity of a rank within the channel state information report determined based on the channel state information report configuration.

Example 11. The apparatus of example 9 or 10, wherein the one or more channel state information quantities comprise at least one of: a channel quality indicator, a layer indication, a precoding matrix indicator, reference signal received power, a rank indicator, or a layer 1 signal to interference plus noise ratio.

Example 12. The apparatus of any of examples 9 to 11, wherein one or more channel state information reference signal antenna port subsets corresponding to the one or more sub-configurations are associated with a same channel state information reference signal resource or resource set.

Example 13. The apparatus of any of examples 9 to 12, wherein a sub-configuration of the one or more sub-configurations is associated with at least one of: a spatial pattern, a power level, an energy level, a channel state information reference signal resource, a channel state information reference signal resource set or group, a resource setting, a channel state information report configuration, a codebook configuration, or a channel state information triggering state.

Example 14. The apparatus of any of examples 9 to 13, wherein the hypothetical physical downlink shared channel is formed in consideration of an antenna port restriction based on the at least one channel state information reference signal antenna port subset the sub-configuration corresponds to or indicates.

Example 15. A method including: receiving, from a network, a channel state information report configuration comprising one or more sub-configurations, wherein a sub-configuration of the one or more sub-configurations is associated with at least one channel state information reference signal antenna port subset; determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculating the one or more channel state information quantities for the sub-configuration, based on the formed hypothetical physical downlink shared channel.

Example 16. A method including: determining a channel state information report configuration comprising one or more sub-configurations, wherein a sub-configuration of the one or more sub-configurations is associated with at least one channel state information reference signal antenna port subset; transmitting, to a user equipment, a channel state information report configuration comprising the one or more sub-configurations; receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determining spatial adaptation for a set of at least one spatial element, based on the channel state information report.

Example 17. An apparatus including: means for receiving, from a network, a channel state information report configuration comprising one or more sub-configurations, wherein a sub-configuration of the one or more sub-configurations is associated with at least one channel state information reference signal antenna port subset; means for determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and means for calculating the one or more channel state information quantities for the sub-configuration, based on the formed hypothetical physical downlink shared channel.

Example 18. An apparatus including: means for determining a channel state information report configuration comprising one or more sub-configurations, wherein a sub-configuration of the one or more sub-configurations is associated with at least one channel state information reference signal antenna port subset; means for transmitting, to a user equipment, a channel state information report configuration comprising the one or more sub-configurations; means for receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and means for determining spatial adaptation for a set of at least one spatial element, based on the channel state information report.

Example 19. A computer readable medium storing program instructions executable by at least one processor for performing operations, the operations including: receiving, from a network, a channel state information report configuration comprising one or more sub-configurations, wherein a sub-configuration of the one or more sub-configurations is associated with at least one channel state information reference signal antenna port subset; determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculating the one or more channel state information quantities for the sub-configuration, based on the formed hypothetical physical downlink shared channel.

Example 20. A computer readable medium storing program instructions executable by at least one processor for performing operations, the operations including: determining a channel state information report configuration comprising one or more sub-configurations, wherein a sub-configuration of the one or more sub-configurations is associated with at least one channel state information reference signal antenna port subset; transmitting, to a user equipment, a channel state information report configuration comprising the one or more sub-configurations; receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determining spatial adaptation for a set of at least one spatial element, based on the channel state information report.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, slash, or number, and may be case insensitive):

3GPP third generation partnership project
4G fourth generation
5G fifth generation
5GC 5G core network
A-CSI aperiodic channel state information
AAU active antenna unit
AMF access and mobility management function
ASIC application-specific integrated circuit
BM beam management
BWP bandwidth part
CC component carrier
CD compact/computer disc
CE control element
CPU central processing unit
CQI channel quality indicator
CRI CSI-RS resource indicator
CSI channel state information
CSI-RS channel state information reference signal
CU central unit or centralized unit
DCI downlink control information
DL downlink
DSP digital signal processor
DVD digital versatile disc
eNB evolved Node B (e.g., an LTE base station)
EN-DC E-UTRAN new radio-dual connectivity
en-gNB node providing NR user plane and control plane protocol terminations towards the UE, and acting as a secondary node in EN-DC
EPRE energy per resource element
E-UTRA evolved universal terrestrial radio access, i.e., the LTE radio access technology
E-UTRAN E-UTRA network
F1 interface between the CU and the DU
FPGA field-programmable gate array
gNB base station for 5G/NR, i.e., a node providing NR user plane and control plane protocol terminations towards the UE, and connected via the NG interface to the 5GC
GSMA Global System for Mobile communications Association
IAB integrated access and backhaul
I/F interface
I/O input/output
L1 layer 1
LI layer indicator or indication
LMF location management function LTE long term evolution (4G)
MAC medium access control
MIMO multiple input multiple output
MME mobility management entity
MRO mobility robustness optimization
NCE network control element
ng or NG new generation
ng-eNB new generation eNB
NG-RAN new generation radio access network
NR new radio
N/W network
NZP non-zero-power
OFDM orthogonal frequency-division multiplexing
OPEX operating expenses
PDA personal digital assistant
PDCP packet data convergence protocol
PDSCH physical downlink shared channel
PHY physical layer
PMI precoding matrix indicator
RAM random access memory
RAN radio access network
RAN1 radio layer 1
RE resource element
Rel release
RLC radio link control
RI rank indicator
ROM read-only memory
RRC radio resource control
RS reference signal
RSRP reference signal received power
RU radio unit
Rx receiver or reception
SDAP service data adaptation protocol
SGW serving gateway
SINR signal-to-interference-plus-noise ratio
SMF session management function
SON self-organizing/optimizing network
SP-CSI semi-persistent channel state information
TRP transmission reception point
TRS tracking reference signal
Tx transmitter or transmission
UAV unmanned aerial vehicle
UE user equipment (e.g., a wireless, typically mobile device)
UL uplink
UPF user plane function
USB universal serial bus
X2 network interface between RAN nodes and between RAN and the core network
Xn network interface between NG-RAN nodes
XR extended reality

What is claimed is:

1. An apparatus comprising:
at least one processor; and
at least one memory storing instructions that, when executed by the at least one processor, cause the apparatus at least to:
receive, from a network, a channel state information report configuration comprising one or more sub-configurations, wherein a sub-configuration of the one or more sub-configurations is associated with at least one channel state information reference signal antenna port subset, and wherein one or more channel state information reference signal antenna port subsets corresponding to the one or more sub-configurations are associated with a same channel state information reference signal resource or resource set;
determine, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and
calculate the one or more channel state information quantities for the sub-configuration, based on the formed hypothetical physical downlink shared channel.

2. The apparatus of claim 1, wherein the determining of the hypothetical physical downlink shared channel comprises determining that physical downlink shared channel signals on physical downlink shared channel antenna ports for a number of layers result in signals equivalent to corresponding symbols transmitted on the at least one channel state information reference signal antenna port subset.

3. The apparatus of claim 1, wherein the instructions, when executed by the at least one processor, cause the apparatus at least to:
calculate the number of layers for the sub-configuration;
wherein the calculation of the one or more channel state information quantities for the sub-configuration is based on the calculated number of layers for the sub-configuration.

4. The apparatus of claim 3, wherein the number of layers corresponds to a rank of the sub-configuration for which the one or more channel state information quantities are calculated.

5. The apparatus of claim 4, wherein the instructions, when executed by the at least one processor, cause the apparatus at least to:
transmit, to a network node, the one or more channel state information quantities of the rank within a channel state information report determined based on the channel state information report configuration.

6. The apparatus of claim 1, wherein the one or more channel state information quantities comprise at least one of: a channel quality indicator, a layer indication, a precoding matrix indicator, reference signal received power, a rank indicator, or a layer 1 signal to interference plus noise ratio.

7. The apparatus of claim 1, wherein a sub-configuration of the one or more sub-configurations is associated with at least one of:
a spatial pattern,
a power level,
an energy level,
a channel state information reference signal resource,
a channel state information reference signal resource set or group,
a resource setting,
a channel state information report configuration,
a codebook configuration, or
a channel state information triggering state.

8. An apparatus comprising:
at least one processor; and
at least one memory storing instructions that, when executed by the at least one processor, cause the apparatus at least to:
determine a channel state information report configuration comprising one or more sub-configurations, wherein a sub-configuration of the one or more sub-configurations is associated with at least one channel state information reference signal antenna port subset, and wherein one or more channel state information reference signal antenna port subsets corresponding to the one or more sub-configurations are associated with a same channel state information reference signal resource or resource set;

transmit, to a user equipment, the channel state information report configuration comprising the one or more sub-configurations;

receive, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determine spatial adaptation for a set of at least one spatial element, based on the channel state information report.

9. The apparatus of claim 8, wherein the one or more channel state information quantities comprises a channel state information quantity of a rank within the channel state information report determined based on the channel state information report configuration.

10. The apparatus of claim 8, wherein the one or more channel state information quantities comprise at least one of: a channel quality indicator, a layer indication, a precoding matrix indicator, reference signal received power, a rank indicator, or a layer 1 signal to interference plus noise ratio.

11. The apparatus of claim 8, wherein a sub-configuration of the one or more sub-configurations is associated with at least one of:
a spatial pattern,
a power level,
an energy level,
a channel state information reference signal resource,
a channel state information reference signal resource set or group,
a resource setting,
a channel state information report configuration,
a codebook configuration, or
a channel state information triggering state.

12. The apparatus of claim 8, wherein the hypothetical physical downlink shared channel is formed in consideration of an antenna port restriction based on the at least one channel state information reference signal antenna port subset the sub-configuration corresponds to or indicates.

13. A method comprising:
receiving, from a network, a channel state information report configuration comprising one or more sub-configurations, wherein a sub-configuration of the one or more sub-configurations is associated with at least one channel state information reference signal antenna port subset, and wherein one or more channel state information reference signal antenna port subsets corresponding to the one or more sub-configurations are associated with a same channel state information reference signal resource or resource set;

determining, for a calculation of one or more channel state information quantities for the sub-configuration corresponding to or indicating the at least one channel state information reference signal antenna port subset, a hypothetical physical downlink shared channel by considering an antenna port restriction based on the at least one channel state information reference signal antenna port subset the sub-configuration corresponds to or indicates; and calculating the one or more channel state information quantities for the sub-configuration, based on the formed hypothetical physical downlink shared channel.

14. A method comprising:
determining a channel state information report configuration comprising one or more sub-configurations, wherein a sub-configuration of the one or more sub-configurations is associated with at least one channel state information reference signal antenna port subset, and wherein one or more channel state information reference signal antenna port subsets corresponding to the one or more sub-configurations are associated with a same channel state information reference signal resource or resource set;

transmitting, to a user equipment, the channel state information report configuration comprising the one or more sub-configurations;

receiving, from the user equipment, a channel state information report comprising one or more channel state information quantities for the sub-configuration corresponding to or indicating the at least one channel state information reference signal antenna port subset, wherein the one or more channel state information quantities for the sub-configuration are calculated based on a formed hypothetical physical downlink shared channel; and determining spatial adaptation for a set of at least one spatial element, based on the channel state information report.

* * * * *